(12) United States Patent
Hall (10) Patent No.: US 9,788,329 B2
(45) Date of Patent: *Oct. 10, 2017

(54) NON-INTERFERENCE TECHNIQUE FOR SPATIALLY AWARE MOBILE AD HOC NETWORKING

(71) Applicant: AT&T Intellectual Property II, L.P., Atlanta, GA (US)

(72) Inventor: Robert J. Hall, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/875,735

(22) Filed: May 2, 2013

(65) Prior Publication Data
US 2013/0242956 A1    Sep. 19, 2013

Related U.S. Application Data

(63) Continuation of application No. 11/264,834, filed on Nov. 1, 2005, now Pat. No. 8,483,616.

(51) Int. Cl.
*H04J 3/00* (2006.01)
*H04W 72/08* (2009.01)
(Continued)

(52) U.S. Cl.
CPC ......... *H04W 72/082* (2013.01); *H04W 16/12* (2013.01); *H04W 74/0816* (2013.01); *H04W 84/18* (2013.01)

(58) Field of Classification Search
CPC . H04W 28/26; H04W 28/0236; H04W 28/04; H04W 28/046; H04W 28/048;
(Continued)

(56) References Cited

U.S. PATENT DOCUMENTS 3,833,221 A    9/1974 Van Tol
5,483,667 A *  1/1996 Faruque .................. 455/447
(Continued)

FOREIGN PATENT DOCUMENTS

WO    WO 02/054671 A2    7/2002
WO    WO 2007/016641 A2  2/2007

OTHER PUBLICATIONS

U.S. Appl. No. 13/683,025, filed Nov. 21, 2012, Panta.
(Continued)

*Primary Examiner* — Ian N Moore
*Assistant Examiner* — Phong La
(74) *Attorney, Agent, or Firm* — Baker & Hostetler LLP (57) ABSTRACT

A system and method for reducing interference between wireless terminals communicating in a mobile ad-hoc network (MANET). Interference is reduced by dividing the MANET into a number of geographical areas having a specific size and shape. Each geographical area is assigned a time slot during which wireless terminals located in the respective geographical area may transmit to other wireless terminals. The time slots are assigned such that geographical areas having the same time slot are far enough away from each other that wireless terminals located in such same time slot geographical areas are outside the interference range of each other.

20 Claims, 3 Drawing Sheets

(51) Int. Cl.
  *H04W 74/08*  (2009.01)
  *H04W 16/12*  (2009.01)
  *H04W 84/18*  (2009.01)

(58) Field of Classification Search
  CPC ........... H04W 52/243; H04W 72/0446; H04W 36/20; H04W 72/08; H04W 72/1263; H04W 40/16; H04W 74/0816; H04W 84/18; H04W 52/24
  See application file for complete search history.

(56) References Cited

U.S. PATENT DOCUMENTS

| | | | |
|---|---|---|---|
| 5,583,866 A * | 12/1996 | Vook et al. | 370/312 |
| 5,898,730 A * | 4/1999 | Hensley et al. | 375/224 |
| 5,930,716 A * | 7/1999 | Sonetaka | H04W 16/06 370/337 |
| 6,006,328 A | 12/1999 | Drake | |
| 6,015,344 A | 1/2000 | Kelly et al. | |
| 6,052,594 A * | 4/2000 | Chuang et al. | 455/450 |
| 6,069,885 A * | 5/2000 | Fong et al. | 370/336 |
| 6,119,976 A | 9/2000 | Rogers | |
| 6,195,751 B1 | 2/2001 | Caronni et al. | |
| 6,304,556 B1 | 10/2001 | Haas | |
| 6,360,107 B1 * | 3/2002 | Lin | H04W 16/10 455/562.1 |
| 6,428,470 B1 | 8/2002 | Thompson | |
| 6,516,199 B1 * | 2/2003 | Soderkvist | H04J 3/0605 370/509 |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,842,482 B1 | 1/2005 | Hiramatsu | |
| 6,870,846 B2 | 3/2005 | Cain | |
| 6,873,613 B1 * | 3/2005 | Dent | 370/347 |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,435,179 B1 | 10/2008 | Ford | |
| 7,525,933 B1 | 4/2009 | Hall | |
| 7,540,028 B2 | 5/2009 | Ahmed et al. | |
| 7,613,467 B2 | 11/2009 | Fleischman | |
| 7,669,052 B2 | 2/2010 | Asano et al. | |
| 7,813,326 B1 | 10/2010 | Kelm et al. | |
| 7,864,168 B2 | 1/2011 | French | |
| 7,917,169 B1 | 3/2011 | Hall | |
| 7,969,914 B1 | 6/2011 | Gerber | |
| 7,970,749 B2 | 6/2011 | Uhlir et al. | |
| 8,073,327 B2 | 12/2011 | Mayer | |
| 8,085,813 B2 | 12/2011 | Melick et al. | |
| 8,128,405 B2 | 3/2012 | Preston et al. | |
| 8,248,367 B1 | 8/2012 | Barney et al. | |
| 8,332,544 B1 | 12/2012 | Ralls et al. | |
| 8,341,271 B2 | 12/2012 | Cho et al. | |
| 8,359,643 B2 | 1/2013 | Low et al. | |
| 8,376,857 B1 | 2/2013 | Shuman et al. | |
| 8,483,652 B2 | 7/2013 | Hall | |
| 8,599,848 B2 | 12/2013 | Janneteau | |
| 9,161,158 B2 | 10/2015 | Hall | |
| 2001/0014094 A1 | 8/2001 | Epley | |
| 2002/0067730 A1 | 6/2002 | Hinderks et al. | |
| 2002/0085582 A1 | 7/2002 | Kim | |
| 2002/0113872 A1 | 8/2002 | Kinjo | |
| 2002/0141454 A1 | 10/2002 | Muniere | |
| 2002/0155846 A1 | 10/2002 | Shiraga | |
| 2002/0167960 A1 | 11/2002 | Garcia-Luna-Aceves | |
| 2002/0169971 A1 | 11/2002 | Asano et al. | |
| 2002/0172186 A1 * | 11/2002 | Larsson | 370/349 |
| 2003/0012167 A1 * | 1/2003 | Benveniste | 370/338 |
| 2003/0074413 A1 | 4/2003 | Nielsen et al. | |
| 2003/0087645 A1 * | 5/2003 | Kim et al. | 455/453 |
| 2003/0105956 A1 | 6/2003 | Ishiguro et al. | |
| 2003/0137993 A1 * | 7/2003 | Odman | 370/468 |
| 2003/0145095 A1 | 7/2003 | Liu et al. | |
| 2003/0153373 A1 | 8/2003 | Squibbs | |
| 2003/0174690 A1 * | 9/2003 | Benveniste | 370/350 |
| 2003/0193394 A1 | 10/2003 | Lamb | |
| 2003/0210710 A1 * | 11/2003 | Odman | 370/471 |
| 2003/0235158 A1 | 12/2003 | Lee | |
| 2004/0013062 A1 * | 1/2004 | Hino et al. | 369/47.14 |
| 2004/0032847 A1 * | 2/2004 | Cain | 370/338 |
| 2004/0083385 A1 | 4/2004 | Ahmed et al. | |
| 2004/0121786 A1 * | 6/2004 | Radcliffe et al. | 455/500 |
| 2004/0121792 A1 | 6/2004 | Allen et al. | |
| 2004/0137907 A1 * | 7/2004 | Kim | 455/450 |
| 2004/0151144 A1 | 8/2004 | Benveniste | |
| 2004/0156351 A1 * | 8/2004 | Kim | 370/349 |
| 2004/0184481 A1 * | 9/2004 | Lee | 370/469 |
| 2004/0185881 A1 | 9/2004 | Lee et al. | |
| 2004/0213270 A1 | 10/2004 | Su et al. | |
| 2004/0214571 A1 * | 10/2004 | Hong | 455/435.1 |
| 2004/0259563 A1 * | 12/2004 | Morton et al. | 455/452.2 |
| 2005/0036448 A1 | 2/2005 | Leeuwen | |
| 2005/0039040 A1 | 2/2005 | Ransom et al. | |
| 2005/0047386 A1 * | 3/2005 | Yi | 370/345 |
| 2005/0058151 A1 * | 3/2005 | Yeh | 370/445 |
| 2005/0068934 A1 * | 3/2005 | Sakoda | 370/350 |
| 2005/0086350 A1 | 4/2005 | Mai | |
| 2005/0096031 A1 * | 5/2005 | Sugaya et al. | 455/422.1 |
| 2005/0129051 A1 * | 6/2005 | Zhu et al. | 370/445 |
| 2005/0135318 A1 * | 6/2005 | Walton et al. | 370/338 |
| 2005/0141451 A1 * | 6/2005 | Yoon et al. | 370/329 |
| 2005/0152318 A1 | 7/2005 | Elbatt et al. | |
| 2005/0152378 A1 | 7/2005 | Bango et al. | |
| 2005/0208949 A1 * | 9/2005 | Chiueh | H04L 45/125 455/452.2 |
| 2005/0243788 A1 | 11/2005 | Janczak | |
| 2005/0254453 A1 | 11/2005 | Barneah | |
| 2005/0259597 A1 | 11/2005 | Benedetto | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |
| 2006/0236153 A1 | 10/2006 | Aaltonen | |
| 2007/0008925 A1 | 1/2007 | Dravida et al. | |
| 2007/0019591 A1 | 1/2007 | Chou et al. | |
| 2007/0019594 A1 | 1/2007 | Perumal et al. | |
| 2007/0104096 A1 | 5/2007 | Ribera | |
| 2007/0110092 A1 | 5/2007 | Kangude et al. | |
| 2007/0180533 A1 | 8/2007 | Ramaiah et al. | |
| 2007/0198731 A1 | 8/2007 | Li et al. | |
| 2007/0217346 A1 | 9/2007 | Zheng | |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |
| 2007/0265088 A1 | 11/2007 | Nakada et al. | |
| 2007/0265089 A1 | 11/2007 | Robarts et al. | |
| 2007/0266396 A1 | 11/2007 | Estermann | |
| 2007/0283001 A1 | 12/2007 | Spiess et al. | |
| 2007/0287437 A1 | 12/2007 | Cartmell | |
| 2008/0015024 A1 | 1/2008 | Mullen | |
| 2008/0039113 A1 | 2/2008 | Liu et al. | |
| 2008/0058099 A1 | 3/2008 | Schwartz et al. | |
| 2008/0076569 A1 | 3/2008 | Tabata | |
| 2008/0080401 A1 | 4/2008 | Ribiere | |
| 2008/0137624 A1 | 6/2008 | Silverstrim et al. | |
| 2008/0144493 A1 | 6/2008 | Yeh | |
| 2008/0147854 A1 | 6/2008 | Van Datta et al. | |
| 2008/0159236 A1 | 7/2008 | Ch'ng | |
| 2008/0163355 A1 | 7/2008 | Chu | |
| 2008/0186206 A1 | 8/2008 | Reumerman | |

(56) References Cited

U.S. PATENT DOCUMENTS

| | | |
|---|---|---|
| 2008/0192737 A1 | 8/2008 | Miyazaki |
| 2008/0262928 A1 | 10/2008 | Michaelis |
| 2009/0005140 A1 | 1/2009 | Rose et al. |
| 2009/0017913 A1 | 1/2009 | Bell et al. |
| 2009/0030605 A1 | 1/2009 | Breed |
| 2009/0041039 A1 | 2/2009 | Bear |
| 2009/0045977 A1 | 2/2009 | Bai et al. |
| 2009/0046628 A1 | 2/2009 | Hall |
| 2009/0073912 A1 | 3/2009 | Bauchot et al. |
| 2009/0122753 A1 | 5/2009 | Hughes et al. |
| 2009/0138353 A1 | 5/2009 | Mendelson |
| 2009/0175223 A1 | 7/2009 | Hall |
| 2009/0195401 A1 | 8/2009 | Maroney et al. |
| 2009/0201860 A1 | 8/2009 | Sherman et al. |
| 2009/0207783 A1 | 8/2009 | Choi et al. |
| 2009/0245518 A1 | 10/2009 | Bae et al. |
| 2009/0248420 A1 | 10/2009 | Basir |
| 2009/0292926 A1 | 11/2009 | Daskalopoulos et al. |
| 2009/0298461 A1 | 12/2009 | O'Reilly |
| 2009/0323579 A1 | 12/2009 | Bai et al. |
| 2009/0325603 A1 | 12/2009 | Van Os et al. |
| 2010/0008259 A1 | 1/2010 | Yoon et al. |
| 2010/0029245 A1 | 2/2010 | Wood et al. |
| 2010/0042601 A1 | 2/2010 | Kelley et al. |
| 2010/0060480 A1 | 3/2010 | Bai et al. |
| 2010/0064307 A1 | 3/2010 | Malhotra et al. |
| 2010/0067451 A1 | 3/2010 | Hall |
| 2010/0069109 A1 | 3/2010 | Hall |
| 2010/0074234 A1 | 3/2010 | Banks et al. |
| 2010/0082513 A1 | 4/2010 | Liu |
| 2010/0128653 A1 | 5/2010 | Tateson |
| 2010/0150129 A1 | 6/2010 | Jin et al. |
| 2010/0162149 A1 | 6/2010 | Sheleheda et al. |
| 2010/0169009 A1 | 7/2010 | Breed et al. |
| 2010/0214987 A1 | 8/2010 | Mori |
| 2010/0215040 A1 | 8/2010 | Kappler et al. |
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0016225 A1 | 1/2011 | Park et al. |
| 2011/0063116 A1 | 3/2011 | Lepley et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |
| 2012/0023550 A1 | 1/2012 | Xu et al. |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0090000 A1 | 4/2012 | Cohen et al. |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2012/0329538 A1 | 12/2012 | Hall |
| 2013/0012231 A1 | 1/2013 | Hall |
| 2013/0099941 A1 | 4/2013 | Hall |
| 2013/0099976 A1 | 4/2013 | Cornwall et al. |
| 2013/0157692 A1 | 6/2013 | Hall |
| 2014/0082369 A1 | 3/2014 | Waclawsky et al. |
| 2014/0100027 A1 | 4/2014 | Harris et al. |
| 2014/0161006 A1 | 6/2014 | Hall |

OTHER PUBLICATIONS

U.S. Appl. No. 13/713,353, filed Dec. 12, 2012, Hall.

U.S. Appl. No. 13/890,423, filed May 9, 2013, Hall.

Ko et al., "Geocasting in Mobile Ad Hoc Networks: Location-based Multicast Algorithms", Technical Report TR-98-018 Texas A&M University, Sep. 1998, 10 pages.

Ko, et al., "Flooding-Based Geocasting Protocols for Mobile Ad Hoc Networks," Mobile Networks and Applications, Dec. 2002, 7, 471-480.

Hall et al., "A Two-Level Quality of Service Scheme for Collision based on Mobile Ad Hoc Networks", IEEE, 1-4244-1513-06/07, 2007, 8 pages.

Hall, "Cheating Attacks and Resistance Techniques in Geogame Design," Proc. 2010 ACM FuturePlay Symposium, 2010, 82-89.

Hall, "An Improved Geocast for Mobile Ad Hoc Networking," IEEE Transactions on Mobile Computing, 2010, 1-14.

Panta, "GeoV2V: Vehicular Communications Using a Scalable Ad Hoc Geocast Protocol," AT&T Labs Research, 14 pages.

Balasubramaniam, et al. "Interactive WiFi Connectivity for Moving Vehicles," Proceedings of SIGCOMM, Aug. 17-22, 2008, 12 pages.

German Aerospace Center, Simulation of Urban Mobility, 2010, http://sumo.sourceforge.net., 1 page.

Hadaller, et al., "Vehicular Opportunistic Communication Under the Microscope," Proceedings of MobiSys, Jun. 11-14, 2007, 206-219.

Heissenbuttel, et al., "BLR: Beacon-Less Routing Algorithm for Mobile Ad-Hoc Networks," Elsevier's Computer Communications Journal, 27, 2003, 15 pages.

Hall, et al., "A Tiered Geocast Protocol for Long Range Mobile Ad Hoc Networking," Proceedings of the 2006 IEEE Military Communications Conf., 2006, 8 pages.

Hull, et al., "CarTel: A Distributed Mobile Sensor Computing System," Proceedings of ACM SenSys, Nov. 2006, 14 pages.

Eriksson, et al., "Cabernet: Vehicular Content Delivery Using WiFi," Proceedings of Mobicom, Sep. 2008, 12 pages.

Karp, et al, "GPSR: Greedy Perimeter Stateless Routing for Wireless Networks," Proceedings of Mobicom, 2000, ACM 2000, 12 pages.

Kuhn, et al., "Geometric Ad-Hoc Routing: Of Theory and Practice," Proc. 2003 Symposium on Principles of Distributed Computing, ACM 2003, 10 pages.

Lee, et al., "Efficient Geographic Routing in Multihop Wireless Networks," Proc. MobiHoc 2005, ACM, 2005, 12 pages.

Ni, et al., "The Broadcast Storm Problem in a Mobile Ad Hoc Network," Proceedings of the 5th Annual ACM/IEEE International Conference on Mobile Computing and Networking, ACM, 1999, 151-162.

Niculescu, et al., "Trajectory Based Forwarding and Its Applications," Proc. Mobicom 2003, ACM, 2003, 13 pages.

Ns-2, "The Network Simulator," 2010, http://isi.edu/nsnam/ns, 2 pages tilisi.edu/nsnam/ns, 2 pages.

Shevade, et al., "Enabling High-Bandwidth Vehicular Content Distribution," Proceedings of CoNEXT 2010, Nov. 30-Dec. 3, 2010, 12 pages.

Yassein, et al., "Performance Analysis of Adjusted Probabilistic Broadcasting in Mobile Ad Hoc Networks," Proc. 11th Inti. Conf. on Parallel and Distributed Systems Workshops, 2005, 27 pages.

Zorzi, et al., "Geographic Random Forwarding (GeRaF) for Ad Hoc and Sensor Networks: Multihop Peformance," IEEE Transactions on Mobile Computing, Dec. 2003, 11 pages.

Social + Gaming—SWiK: http://swik.net/social+0 gaming, 2009.

http://askville.amazon.com/Wii-games-play-Internet-Family/ AnswerViewer.do?requestId=6796582, 2007.

Schutzberg, "Phone-based GPS-based Games: Missing Pieces"; http://www.directionsmag.com/articlephp?article_id=939, Aug. 17, 2005.

(56) References Cited

OTHER PUBLICATIONS

"Sony bigwig hints at GPS-enabled PSP games": http:www.vespacious.com/sony-bigwig-hints-at-gps-enabled-psp-games.html, Dec. 22, 2008.
"Boost Mobile Introduces first Location-based, GPS games in US" http://www.physorg.com/news5824.html , Aug. 16, 2005.
Location-Enabled Mobile Gaming; http://www.nn4d.com/site/global/market/affiliatesites/lbsglobe/lbsapplications/mobilegaming.jsp, 2007.
Das, et al., "SPAWN: A Swarming Protocol for Vehicular Ad-Hoc Wireless Networks," Proceedings of $1^{81}$ACM Vanet, Oct. 2004, 2 pages.
Corbett, Derek J., and David Everitt, "A Partitioned Power and Location Aware MAC Protocol for Mobile Ad Hoc Networks," Technical Report No. 553 (University of Sydney, School of Information Technologies), Jul. 2004.
Gupta, et al., "The Capacity of Wireless Networks," IEEE Transactions on Information Theory, 46(2), Mar. 2000, 17 pages.
Hall, "RTEQ: Modeling and Validating Infinite-State Hard-Real-Time Systems", AT&T Labs Research, ASE 2007, Nov. 2007, 4 pages.
Shih, K.-H, "A Distributed Slots Reservation Protocol for QoS Routing on TDMA-Based Mobile Ad Hoc Networks", Networks (ICON 2004) Proceedings 12th IEEE Inti Conference, 2004, 2, 660-664.
Shih, K.-P, "A Collision Avoidance Power Control MAC Protocol for Wireless Ad Hoc Networks", Communication Letter, Sep. 9, 2005, 9, 859-861.
Lee, et al., "CarTorrent: A Bit-Torrent System for Vehicular Ad-Hoc Networks," Mobile Networking for Vehicular Environments, Sep. 2007, 6 pages.
Liao, W.-H, et al., "GRID: A Fully Location-Aware Routing Protocol for Mobile Ad hoc Networks," Telecommunication Systems, Klumar Academic Publishers, 2001, 18, 1-26.
Conti, M., "Body, Personal, and Local Ad Hoc Wireless Networks", in The Handbook of Ad Hoc Wireless Networks, M. Ilyas, Ed. Boca Raton: CRC Press, 2002, Chapter 1.
M. Ilyas, Ad Hoc Wireless Networks, CRC Press, Chapter 1, 2003, 22 pages.
Maihofer, "A Survey of Geocast Routing Protocols," IEEE Communications Surveys, Jun. 2004, 32-42.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Nicklas, Daniela, and Bernhard Mitschang. "On building location aware applications using an open platform based on the NEXUS Augmented World Model." Software and Systems Modeling 3.4, 2004, 303-313.
Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Schwingenschlogl, "Geocast Enhancements of AODV for Vehicular Networks," ACM SIGMOBILE Mobile Computing and Communications Review, Jun. 2002, 18 pages.
Steve:"GPS-enabled Cell Phone Games" http:/Lwww.strangenewproducts.com/2005/08/gps-enabled-cell-phone-games.html, Aug. 15, 2005.
Tseng, Y.-C, et al., "Fully Power-Aware and Location-Aware Protocols for Wireless Multi-hop Ad Hoc Networks", Proc. of IEEE Inti. Conference on Computer Communications and Networks (ICCCn), 6 pgs., 2002.
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prix_project.asp?iProjectID=12899.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Zahn, et al., "Feasibility of Content Dissemination Between Devices in Moving Vehicles," Proceedings of CoNEXT 2009, Dec. 1-4, 2009, 11 pages.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004 Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
Bzflag(6):tank battle game—linux man page, Google date Feb. 1, 2001, downloaded from http://linux.die.net/man/6/bzflag.
De Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from http://www.dialogic.com/-/media/products/docs/signaling-and-ss7-components/9862_Add_Locationbased_Servs_an.pdf.
Gallagher, Sean, "Army prepares test of new wireless war game gear", Defense Systems, Jul. 7, 2008, downloaded from http://defensesystems.com/articles/2008/07/army-prepares-test-of-new-wireless-war-game-gear.aspx.
Hales, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
U.S. Appl. No. 14/279,441, filed May 16, 2014, Hall.
Panta, "GeoV2V: Vehicular Communications Using a Scalable Ad Hoc Geocast Protocol," AT&T Labs Research, Nov. 2011, 14 pages.
Hall, "Combinatorial Communications Modeling of Real-Time Engagement Adjudication Architectures", 2005 IEEE Military Communications Conference, Oct. 2005, vol. 3, 1488-1494.
Harris, RF-6920 C2CE-CNR Situational Awareness Application Brochure, downloaded from http:/ /rf. harris.com/media/R F-6920 tcm26-9172.pdf, Nov. 2008, 2 pages.
Kaplan, et al., "The Analysis of a Generic Air-to-Air Missile Simulation Model", NASA Technical Memorandum 109057, Jun. 1994, 48 pages.
Trivette, Sensor integration for the One Tactical Engagement Simulation System (One TESS), downloaded from http://vault.swri .org/

(56) References Cited

OTHER PUBLICATIONS cms/papers/3793 Presentation_2005 SensorsGov OneTESS.pdf, 2005, 28 pgs.

* cited by examiner

NON-INTERFERENCE TECHNIQUE FOR SPATIALLY AWARE MOBILE AD HOC NETWORKING

CROSS REFERENCE TO RELATED APPLICATIONS

The instant application is a continuation application of, and claims priority to, U.S. patent application Ser. No. 11/264,834, filed Nov. 1, 2005. U.S. patent application Ser. No. 11/264,834 is incorporated herein by reference in its entirety.

BACKGROUND OF THE INVENTION

The present invention is directed to a mobile ad hoc network (MANET). More specifically, the present invention is directed to a method and system for limiting interference between mobile units communicating in a MANET.

A MANET is basically a network of mobile wireless terminals, such as wireless phones, that communicate with each other within a given region or area. Each wireless terminal is capable of receiving/transmitting data packets to/from other wireless terminals in the network. The wireless terminals have a detection range (i.e. the distance within which a wireless terminal can detect a transmission from another wireless terminal) and a link range (i.e. the maximum distance apart two wireless terminals may be and yet still send data successfully from one to the other in the absence of interference), and an interference range (i.e. the maximum distance apart two wireless terminals A and B may be such that there exists a point P that is within link range of A and yet a transmission from B would interfere with the transfer of data from A to a wireless terminal located at P). A wireless terminal B is said to interfere with a transmission from terminal A to wireless terminal C if, in the absence of terminal B, terminal C would successfully receive the transmission from terminal A, and if terminal B transmits during the transmission from terminal A to terminal C it results in an unsuccessful reception of the transmission at terminal C.

The wireless terminals basically collaborate to route packets amongst themselves according to link relationships. Current approaches to MANET use Carrier-Sense Multiple Access with Collision Avoidance (CSMA/CA) techniques to control the broadcasting of the wireless terminals. In CSMA/CA, a wireless terminal briefly listens for the "carrier" presence. If it is present, the wireless terminal waits to transmit/broadcast. If it is not present, the wireless terminal transmits/broadcasts immediately.

In a MANET environment, the difficulty with CSMA/CA is that communications between a sending wireless terminal and a receiving wireless terminal may be lost when the sending wireless terminal is outside the detection range of a distant wireless terminal, and the receiving wireless terminal is within the interference range of the distant wireless terminal. When this happens, the sending wireless terminal will not detect the carrier of the distant wireless terminal and, in accordance with CSMA/CA, will transmit to the receiving wireless terminal. The transmission, however, will not be received by the receiving wireless terminal because its reception will be interfered with by the distant wireless terminal. Thus, broadcasting within a MANET can be unreliable due to such collision/interference from distant wireless terminals.

BRIEF SUMMARY OF THE INVENTION

The present invention provides a system and method for reducing interference/collision between wireless terminals in a MANET. This is accomplished by dividing the MANET into discrete geographical areas, and assigning transmission time slots to the geographical areas such that wireless terminals in different geographical areas having the same time slot are incapable of interfering with each other.

In accordance with an embodiment of the invention, a MANET is divided into hexagonal-shaped geographical areas wherein each geographical area has a diameter D (i.e. the maximum distance there can be between any two points in the geographical area), equal to the detection range of the wireless terminals, and each geographical area is assigned one of seven different time slots such that any two areas having the same time slot are separated by at least the interference range of the wireless terminals. Such a configuration ensures that the wireless terminals in a given geographical area are all within the detection range of each other, and that geographical areas having the same time slot are far enough from each other that wireless terminals in such "same time slot areas" can not interfere with each other.

Time may be partitioned into a set P of non-overlapping intervals, each of which is a contiguous interval of time. A time slot scheme for P is an association of each interval within P to one of a finite set of slots. For example, P could consist of 10 millisecond long intervals, each starting at an even multiple of 10 milliseconds since a reference origin time. A time slot scheme having seven slots numbered 0 through 6 would assign slot 0 to all intervals beginning at times 7 k+0, slot 1 to all intervals beginning at times 7 k+10, slot 2 to all intervals beginning at times 7 k+20, etc., where k is any member of the set {0 msec, 70 msec, 140 msec, 210 msec, . . . }. (Again, these times are measured from some predetermined time origin or synchronization point.) An alternative embodiment may choose a non-covering set of intervals, so that there could be 'gaps' not belonging to any assigned time slot.

In accordance with another embodiment of the invention, a wireless terminal communicating in a MANET is operable to determine its location using, for example, the global positioning system. The wireless terminal stores mapping information defining the MANET as being divided into a plurality of geographical areas and being assigned one of a set of time slots T. The wireless terminal determines which geographical area it is located in, based on its geographic location, and determines which time slot is assigned to the geographical area. The wireless terminal transmits only during the assigned time slot T.

The wireless terminal stores mapping information defining the MANET as being divided into a plurality of geographical areas. By way of non-limiting example, each geographical area could be a regular hexagon and have diameter D, wherein each of said areas is assigned a time slot T selected from a set of time slots. The wireless terminal determines which geographical area it is located in, based on its geographic location (typically through use of a geo-positioning device such as a GPS unit) and said mapping information, and determines which time slot is assigned to the geographical area. The wireless terminal transmits only during a time interval assigned to time slot T. If the wireless terminal wishes to transmit at a time outside of such time slot intervals, it holds the data and transmits it at some later time within timeslot T.

Advantageously, all wireless terminals can "listen" and receive data during all time slots. In this way, a terminal in one geographical area may communicate directly with terminals in other areas, without necessitating sending the traffic through a 'base station' or other relaying facility. This reduces total traffic and reduces the delay in message delivery caused by multiple hops. This distinguishes the present invention from cellular telephone radio schemes, all of which require traffic between mobile terminals in different areas to transit the base stations of those areas. Also, it is advantageous that the present invention requires no fixed infrastructure, whereas cellular telephony and like schemes require the installation of cell towers and base stations.

Advantageously, an alternative embodiment may obey the time slot transmission scheme above only for certain types of transmissions, such as (for example) only for broadcast transmissions, where other media-access protocols may be used for other types of traffic. For example, for unicast traffic (where one terminal wants send to exactly one other, known, terminal), the method could use the standard MACAW protocol as is known in the art (wherein CTS, RTS, DATA, and ACK messages are exchanged without regard to what timeslot each is transmitted in). Thus, the present invention can be used as a means to reduce broadcast interference concurrently with other known techniques for reducing interference for unicast traffic. Other combinations are possible as well.

These and other advantages of the invention will be apparent to those of ordinary skill in the art by reference to the following detailed description and the accompanying drawings.

DETAILED DESCRIPTION

Figure 1:
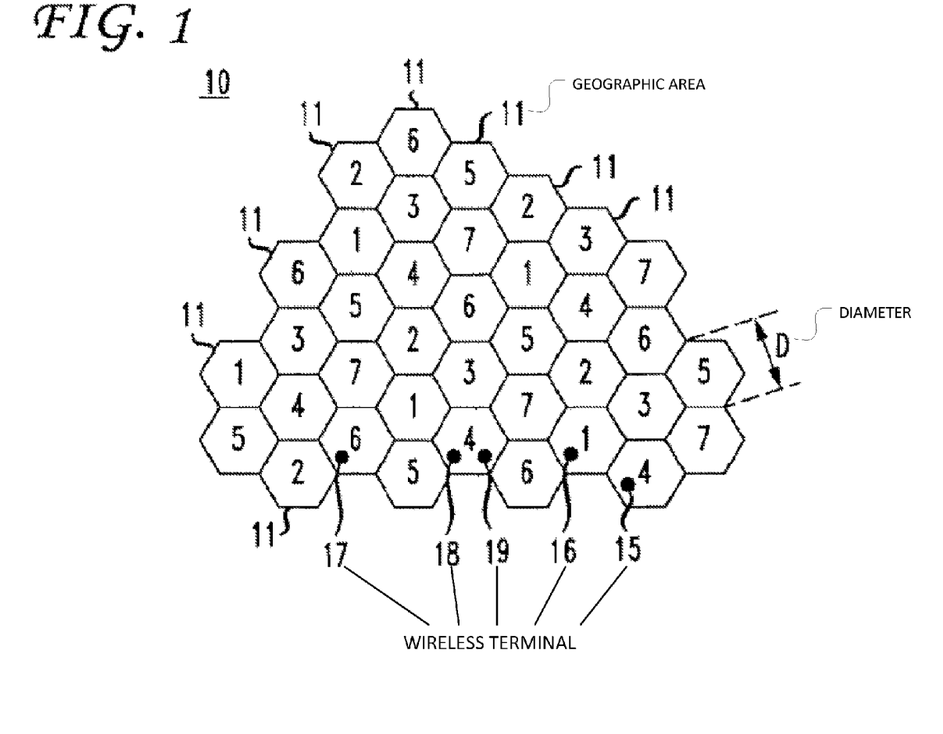
FIG. 1 shows an embodiment of a MANET divided into geographical areas having assigned time slots in accordance with the present invention.

FIG. 1 shows an embodiment of a MANET 10 that is divided into geographical areas 11 having assigned time slots in accordance with the present invention. MANET 10 is a network of mobile devices, or wireless terminals, that are capable of transmitting/receiving data packets to/from each other. The wireless terminals use CSMA/CA techniques to control the broadcasting of packets within MANET 10. Each wireless terminal in MANET 10 is capable of determining its own geographical location through, for example, the Global Positioning System (GPS). Further, each wireless terminal in MANET 10 has a detection range, a link range, and an interference range. The detection range is the maximum distance at which a wireless terminal can detect a transmission from another wireless terminal. The link range is the maximum distance within which a wireless terminal can successfully receive a data message intact from another wireless terminal in the absence of interference. The interference range is the maximum distance apart two wireless terminals A and B may be such that there exists a point P that is within link range of terminal A and yet a transmission from terminal B would interfere with the transfer of data from terminal A to a wireless terminal located at P.

As shown, MANET 10 covers a geographical operating region including geographical areas 11. Each geographical area 11 has a hexagonal shape with a diameter D. The diameter D of a given geographical area 11 is the maximum distance there can be between any two points in the geographical area. In MANET 10, each geographical area 11 has a diameter D equal to detection range of the wireless terminals communicating therein. This insures that wireless terminals within the geographical area can detect transmissions from each other and can thus avoid collisions with each other using CSMA/CA.

Each geographical area 11 is assigned one of time slots 1-7. Time slots 1-7 are periods of time during which a wireless terminal located in MANET 10 may transmit packet data to other wireless terminals. For example, wireless terminal 15 located in the geographical area assigned time slot 4 may only transmit during time slot 4. Similarly, wireless terminal 17 located in the geographical area assigned time slot 6 may only transmit during time slot 6.

In accordance with the present invention, time slots 1-7 are assigned such that geographical areas having the same time slot are far enough from each other that wireless terminals within them cannot interfere with each other. This is accomplished by making sure that the wireless terminals in geographical areas having the same time slot are outside the interference range of each other. For example, referring to FIG. 1, the time slots are assigned such that wireless terminal 15 located in the geographical area assigned time slot 4 can not interfere with communications between wireless terminal 18 and 19 located in a different geographical area also assigned time slot 4. Also, wireless terminal 15 can send a packet during time slot 4 that is received by wireless terminal 16 (located within link range of terminal 15) without the chance of interference by wireless terminal 18 or 19 which may also transmit during time slot 4.

Thus, it should be understood that in order for wireless terminal 15 to be outside the interference range of wireless terminal 19, the minimum distance between their respective geographical areas must be greater than the interference range of the wireless terminals. It should also be understood that if all wireless terminals in MANET 10 restrict when they transmit only to their assigned time slot (determined by using their position sensing capability to see which geographical area they are located in), and only when they can not detect another transmission within their geographical area, they are guaranteed not to interfere with the reception of any other wireless terminals. Advantageously, this avoids packet loss due to interference and the need for time-consuming acknowledgement protocols, as in the prior art.

It should be understood that the present invention is not limited to a MANET being divided into geographical areas having a hexagonal shape. The geographical areas, in accordance with the present invention, can be any desired shape including squares, rectangles, triangles, circles, curvilinear regions, multiple non-congruent shapes, non convex shapes, irregular tessellations, or any arrangement of geometric regions (arrangements which may not cover all points in an area, or in which some regions may overlap each other). Similarly, it should be understood that present invention is not limited to any particular number of time slots. The geographical areas, in accordance with the invention, may be assigned any number of different time slots as long as wireless terminals in geographical areas having the same time slot are outside the interference range of each other. It should therefore be appreciated that using a greater number of time slots provides for the ability for greater separation between the geographical areas having the same time slot.

That is, the greater the number of time slots being assigned, the greater the number of intermediate geographical areas having different time slots can exist between the geographical areas having the same time slot, thereby providing for a greater distance between the geographical areas having the same time slots. Thus, if the wireless transmitters are built with a longer interference range relative to the detection range, more time slots should be used.

As the number of time slots increases, however, there is less time available for each time slot and thus less time in which a wireless terminal may transmit data in any given geographical area. Thus, it is desirable to find the minimum number of times slots needed to achieve the desired separation between the geographical areas having the same time slot.

It should be understood, however, that in one illustrative embodiment, the diameter D of the geographical areas should not be greater than the detection range of the wireless terminals (otherwise wireless terminals within a geographical area can be outside the detection range of each other). Hence, increasing the size of the geographical areas to separate the geographical areas having the same time slot is not always an option. As a result, it is contemplated that in many cases the desired separation will be achieved instead by increasing the number of time slots, which thereby increases the number of intermediate geographical areas that can exist between the "same time slots areas".

In an alternative embodiment, it may be advantageous to define the geographical areas in such a way that they overlap. In this case a wireless terminal located at a point belonging to more than one region will be allowed to transmit during any of the time slots assigned to the overlapping areas. This is within the present invention as long as all geographical areas are still separated by distances great enough to guarantee that terminals in different areas assigned the same time slot do not interfere.

Thus, assuming the geographical areas have a diameter equal to the detection range of the wireless terminals, the minimum number of time slots possible will greatly depend on the ratio R of the interference range to the detection range of the wireless terminals. When R is less than 1 (i.e. when the detection range is greater than the interference range), the wireless terminals in geographical areas having the same time slot do not need to be as far apart as when R is greater than 1 (i.e. when the interference range is greater than the detection range). Thus, it should be understood that for a MANET divided into geographical areas having a fixed size and shape (i.e. having a diameter equal to the detection range of the wireless terminals), as R increases so does the need for a greater number of time slots. This is due to the fact that as R increases so does the number of intermediate geographical regions needed to achieve the desired separation between the geographical areas having the same time slot.

Through experimentation, the inventor herein has found that for a MANET divided into hexagonal-shaped areas having a diameter equal to the detection range of the wireless terminals, the desired number of time slots depends on the ratio R as follows:

1. When R is greater than zero but less than or equal to 0.5, three time slots are preferred.
2. When R is greater than 0.5 but less than or equal to $(\sqrt{3})/2$, four time slots are preferred.
3. When R is greater than $(\sqrt{3})/2$ but less than or equal to $(\sqrt{7})/2$, seven time slots are preferred.
4. When R is greater than $(\sqrt{7})/2$ but less than or equal to $\sqrt{3}$, nine time slots are preferred.
5. When R is greater than $\sqrt{3}$ but less than or equal to 2, twelve time slots are preferred.
6. When R is greater than 2 but less than or equal to $(\sqrt{19})/2$, thirteen time slots are preferred.
7. When R is greater than $(\sqrt{19})/2$ but less than or equal to $3*(\sqrt{3})/2$, sixteen time slots are preferred.

Figure 4:
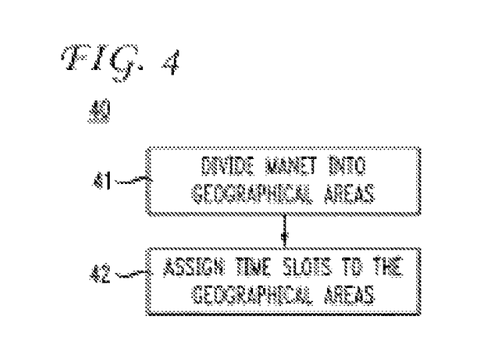
FIG. 4 illustrates an embodiment of a method for reducing interference between wireless terminals communicating in a MANET in accordance with the present invention.

Referring now to FIG. 4, there is shown an embodiment of a method 40 for reducing interference between wireless terminals communicating in a MANET. The wireless terminals each have an interference range and a detection range and are operable to determine their geographical location. Method 40 begins at step 41 wherein the MANET is divided into discrete geographical areas having a given shape and a given size. For example, the geographical areas may have a hexagonal shape with a diameter D equal to the detection range of the wireless terminals. At step 42, each geographical area is assigned one of a plurality of time slots during which wireless terminals located in the geographical area may broadcast.

Assuming the geographical areas have a diameter D equal to the detection range of the wireless terminals, the minimum number of time slots possible will greatly depend on the ratio R of the interference range to the detection range of the wireless terminals. When R is less than 1 (i.e. when the detection range is greater than the interference range), the wireless terminals in geographical areas having the same time slot do not need to be as far apart as when R is greater than 1 (i.e. when the interference range is greater than the detection range). Thus, it should be understood that for a MANET divided into geographical areas having a fixed size and shape (i.e. having a diameter D equal to the detection range of the wireless terminals), as R increases so does the need for a greater number of time slots. This is due to the fact that as R increases so does the number of intermediate geographical regions needed to achieve the desired separation between the geographical areas having the same time slot.

Figure 2:
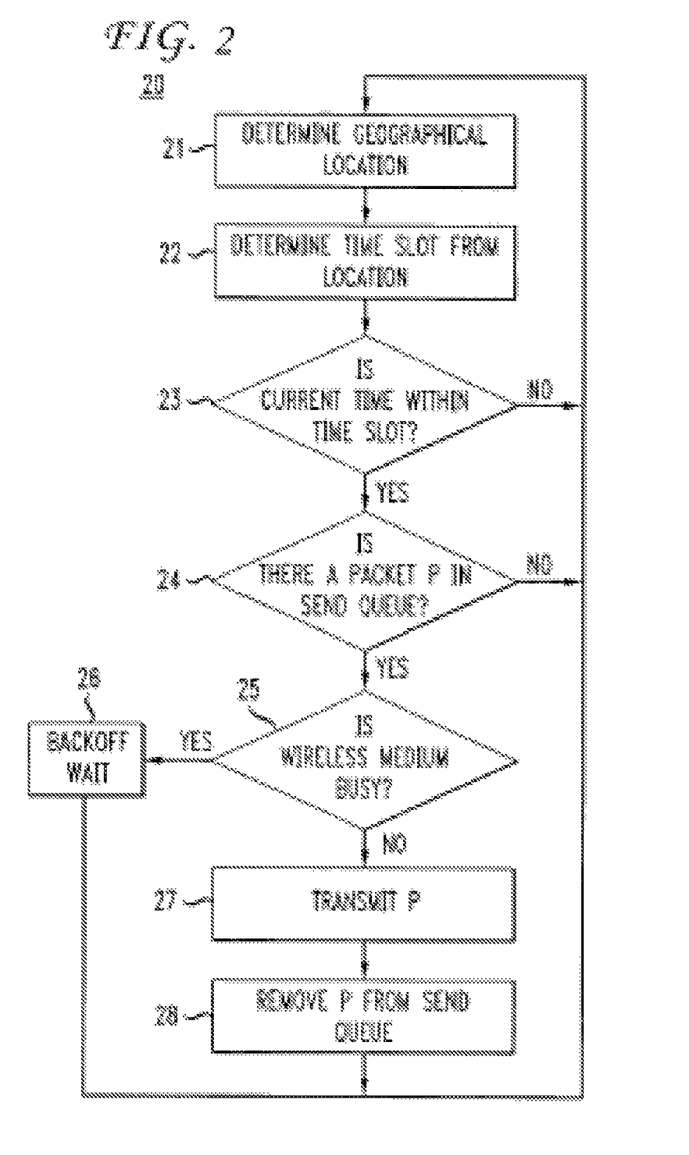
FIG. 2 illustrates a method for a wireless terminal communicating in a MANET in accordance with the present invention.

Referring now to FIG. 2, there is shown a method 20 for a wireless terminal communicating in a MANET in accordance with the present invention. Whenever the wireless terminal determines that another packet needs to be sent, it places it in a queue. Method 20 is an ongoing process loop that continues as new packets are added to the queue. As shown, method 20 begins at step 21 wherein the wireless terminal determines its own geographical location. The wireless terminal may determine its own geographical location through any available means including, for example, a global positioning system.

At step 22, based on its current geographical location, the wireless terminal determines the time slot for the geographical area of the MANET in which it is located. To do this, the wireless terminal may search through its own memory storage device in which there is stored MANET mapping information. The MANET mapping information includes information regarding how the MANET is divided into geographical areas having assigned time slots in accordance with the present invention. MANET 10, shown in FIG. 1, illustrates an example of the type of MANET mapping information that may be stored in the memory storage device of the wireless terminal. In general, the MANET mapping information defines the geographical areas that comprise the MANET, and it lists the transmission time slots assigned to the geographical areas. The information defining the geographical areas of the MANET may include, for example, the size, shape, location and geographical coordinates of each geographical area. Other methods for storing and accessing said mapping information are well known in the art. Each geographical area is thereby identifiable and specific, and is assigned a specific time slot during which a wireless terminal located in the geographical area may transmit.

At step 23, the wireless terminal determines whether the current time is within the time slot determined in step 22. If the current time is not within the time slot, it loops back to step 21 to determine it new location (which can be the same as its previous location if the wireless terminal did not move). If the current time is within the time slot, in step 24, it determines whether there is a packet in the queue. If there is no packet in the queue, it loops back to step 21. If there is a packet in the queue then, in step 25, the wireless terminal determines whether the wireless medium is busy (i.e. another terminal is transmitting). If the medium is busy, then the wireless terminal waits a predetermined period of time at step 26 and then loops back to step 21. If the medium is not busy then, at step 27, the wireless terminal transmits the packet. At step 28, the wireless terminal removes the transmitted packet from the queue and loops back to step 21.

In an alternative embodiment allowing overlapping geographical areas, step 22 would determine the assigned SET of time slots for all areas in which it is located. Step 23 would then determine whether the current time belongs to at least one time slot in that set.

Figure 3:
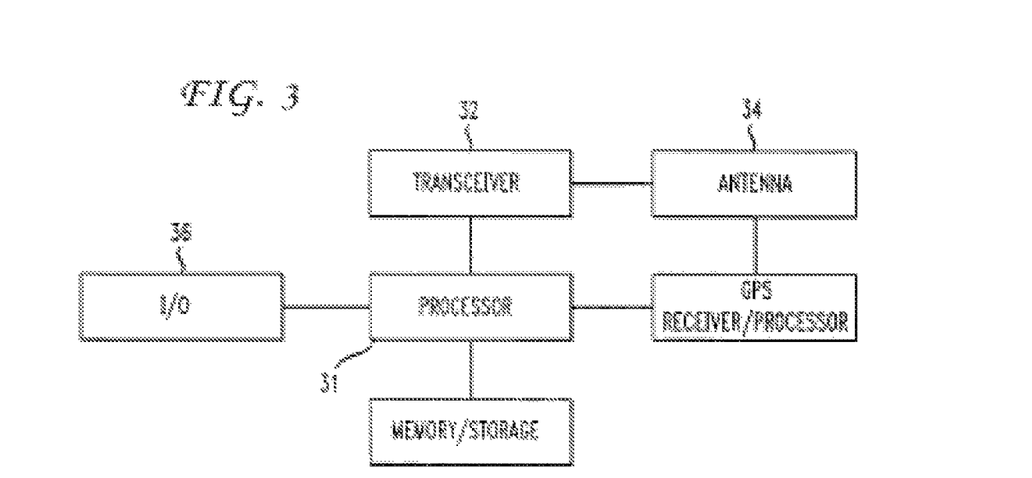
FIG. 3 illustrates an embodiment of a wireless terminal operable to communicate in a MANET in accordance with the present invention.

It should be understood that a wireless terminal in accordance with the present invention may be any wireless device operable to execute a communications application to perform the above described functions. Such wireless terminals executing a communications application are well known in the art, and may be implemented, for example, using well known processors, transceivers, memory units, storage devices, computer software, and other components. A high level block diagram of such a wireless terminal 30 is shown in FIG. 3. As shown, wireless terminal 30 contains a processor 31 which controls the overall operation of wireless terminal 30 by executing computer program instruction which define the communications application. The computer program instructions may be hard coded in processor 31 or loaded from an erasable programmable read only memory device (not shown) when execution of the computer program instructions is desired. Thus, the communications application will be defined by computer program instructions stored in processor 31 and/or erasable programmable read only memory and/or magnetic disk and/or random access memory (not shown) and the communications application will be controlled by processor 31 executing the computer program instructions. Wireless terminal 30 includes a memory storage device 35 in which information including the MANET mapping information described above can be stored. Wireless terminal 30 also include a transceiver 32 coupled to an antenna 34 through which data is received and/or transmitted in a MANET. Wireless terminal 30 also includes a GPS receiver/processor 33 that controls the execution of the geographical locating function of wireless terminal 30. Through GPS receiver/processor 33, wireless terminal 30 can use the global positioning system to determine its own location. Wireless terminal 30 also includes input/output 36 which represents devices (e.g., display, keypad, speakers, buttons, etc.) that allow for user interaction with wireless terminal 30. One skilled in the art will recognize that an implementation of an actual wireless terminal will contain other components as well, and that FIG. 3 is a high level representation of some of the components of such a wireless terminal for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for limiting interference in a mobile ad hoc network comprising:
    calculating, by a device, a ratio of an interference distance of a first device to a detection distance of the first device;
    determining, by the device, a number of time slots based on the ratio;
    assigning, by the device, a time interval to a first time slot of the number of time slots;
    assigning, by the device, the first time slot to a first geographical area and a second geographical area, wherein:
    the first device is located in the first geographical area and transmits only during the time interval; and
    while the first device is located in the first geographical area, a second device located in the second geographical area is outside the interference distance of the first device.

2. The method of claim 1, wherein at least one of the first geographical area and the second geographical area is hexagonal in shape.

3. The method of claim 1, wherein at least one of the first geographical area and the second geographical area has a diameter equal to at least one of the detection distance or a second detection distance of the second device.

4. The method of claim 1, wherein at least one of the first geographical area and the second geographical area is rectangular in shape.

5. The method of claim 1, wherein at least one of the first geographical area and the second geographical area is triangular in shape.

6. The method of claim 1, wherein at least one of the first geographical area and the second geographical area is circular in shape.

7. The method of claim 1, wherein:
    the first geographical area and the second geographical area each has a hexagonal shape with a diameter equal to at least one of the detection distance or a second detection distance of the second device; and
    the first geographical area and the second geographical area are separated by at least the interference distance.

8. A device for limiting interference in a mobile ad hoc network, the device comprising:
    a processor; and
    memory coupled to the processor, the memory comprising executable instructions that when executed by the processor cause the processor to effectuate operations comprising:
        determining a location of the device, the location being in a first geographical area;
        determining a set of time slots, wherein each time slot of the set of time slots is associated with a time interval;

determining that, based on mapping information, a first time slot of the set of time slots that is assigned to the first geographical area; and transmitting during the time interval associated with the first time slot, wherein a second geographical area is assigned to the first time slot and a second device located in the second geographical area is outside an interference distance of the device, and a number of the set of time slots is based on a ratio of the interference distance to a detection distance of the device.

9. The device of claim 8, wherein determining the location of the device is based upon coordinates determined via a global positioning system.

10. The device of claim 8, wherein at least one of the first geographical area and the second geographical area has a hexagonal shape.

11. The device of claim 8, wherein at least one of the first geographical area and the second geographical area has a rectangular shape.

12. The device of claim 8, wherein at least one of the first geographical area and the second geographical area has a triangular shape.

13. The device of claim 8, wherein at least one of the first geographical area and the second geographical area has a circular shape.

14. The device of claim 8, wherein at least one of the first geographical area and the second geographical area has a diameter equal to the detection distance of the device.

15. The device of claim 8, wherein the first geographical area and the second geographical area each has a hexagonal shape with a diameter equal to the detection distance.

16. A method for limiting interference in a mobile ad hoc network comprising:

determining, by a device, an interference distance of a device and a detection distance of the device;

determining, by the device, a number of a set of time slots based on a ratio of the interference distance to the detection distance;

defining, by the device, a plurality of geographical areas based on the detection distance of the device and the number of the set of time slots, the plurality of geographical areas comprising a first geographical area and a second geographical area adjacent to the first geographical area; and assigning, by the device, a first time slot of the set of time slots to the first geographical area and a second time slot of the set of time slots to the second geographical area, wherein a first time slot assigned to the first geographical area differs from a second time slot assigned to the second geographical area, and the device located in the first geographical area transmits only during a time interval associated with the time slot assigned to the first geographical area.

17. The method of claim 16, wherein a diameter of said each of the plurality of geographical areas is less than the detection distance of the device.

18. The method of claim 16, further comprising:

determining that the device has moved from the first geographical area to the second geographical area, wherein the device transmits only during a second time interval, the second time interval associated with the second time slot.

19. The method of claim 16, further comprising providing mapping information to the first device, wherein the mapping information is indicative of the plurality of geographic areas and the time slot of the set of time slot assigned to a respective one of the plurality of geographic areas.

20. The method of claim 16, wherein at least one geographical area of the plurality of geographical areas has a triangular shape.

* * * * *